(12) United States Patent
Cheng (10) Patent No.: US 7,953,930 B2
(45) Date of Patent: *May 31, 2011

(54) DEVICE IDENTIFIERS FOR NONVOLATILE MEMORY MODULES

(75) Inventor: Steven S. Cheng, Sunnyvale, CA (US)

(73) Assignee: SanDisk Corporation, Milpitas, CA (US)

( * ) Notice: Subject to any disclaimer, the term of this patent is extended or adjusted under 35 U.S.C. 154(b) by 752 days.

This patent is subject to a terminal disclaimer.

(21) Appl. No.: 11/952,744

(22) Filed: Dec. 7, 2007

(65) Prior Publication Data

US 2009/0150596 A1 Jun. 11, 2009

(51) Int. Cl.
*G06F 13/00* (2006.01)

(52) U.S. Cl. .................. 711/115; 711/103; 711/E12.008

(58) Field of Classification Search .................. None
See application file for complete search history.

(56) References Cited

U.S. PATENT DOCUMENTS 7,340,639 B1 * 3/2008 Lee et al. .................. 714/6
2004/0205352 A1 * 10/2004 Ohyama .................. 713/194

* cited by examiner

*Primary Examiner* — Shane M Thomas
*Assistant Examiner* — John P Fishburn
(74) *Attorney, Agent, or Firm* — Vierr Magen Marcus & DeNiro LLP (57) ABSTRACT

A memory card has a data scrambler that performs a data scrambling operation on data stored in the memory card according to a device ID associated with the memory card. The device ID is either set at the factory and permanently stored in the card, or configurable by a user or a host system.

11 Claims, 6 Drawing Sheets

DEVICE IDENTIFIERS FOR NONVOLATILE MEMORY MODULES

BACKGROUND OF THE INVENTION

This invention relates to nonvolatile memories and methods of forming nonvolatile memories. In particular, this application relates to nonvolatile memory arrays in which floating gate memory cells individually hold one or more bits of data.

Nonvolatile memory systems are used in various applications. Some nonvolatile memory systems are embedded in a larger system such as a personal computer. Other nonvolatile memory systems are removably connected to a host system and may be interchanged between different host systems. Examples of such removable memory systems (removable memory units) include memory cards and USB flash drives. Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls and supports operation of the memory cell array and interfaces with a host to which the card is connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard. Memory card standards include PC Card, CompactFlash™ card (CF™ card), SmartMedia™ card, MultiMediaCard (MMC™), Secure Digital (SD) card, a MiniSD™ card, Subscriber Identity Module (SIM), Memory Stick™, Memory Stick Duo card and MicroSD/TransFlash™ memory module standards. There are several USB flash drive products commercially available from SanDisk Corporation under its trademark "Cruzer®." USB flash drives are typically larger and shaped differently than the memory cards described above. Other examples of removable memory units include Solid State Drives (SSDs), e.g. using SATA, PCIe, ExpressCard or similar standards. SSDs use solid state memory systems in applications where Hard Disk Drives (HDDs) have traditionally been used, such as in laptop computers.

Different types of memory array architecture are used in nonvolatile memory systems. Flash memory arrays that use floating gates to store charge are one common type of memory array. In one type of architecture, a NAND array, a series of strings of more than two memory cells, such as 16 or 32, are connected along with one or more select transistors between individual bit lines and a reference potential to form columns of cells. Word lines extend across cells within a large number of these columns. An individual memory cell may hold one bit of data in what is known as a Single Level Cell (SLC) design. In some examples, a memory cell may hold two or more bits of data in what is known as a Multi Level Cell (MLC) design.

Reliability is generally an important feature in memory products, and is especially important for certain industrial applications. Thus, there is a need for nonvolatile memory systems with high reliability.

SUMMARY OF THE INVENTION

A combination of Redundant Array of Independent Disk (RAID) techniques and data scrambling can provide high reliability in nonvolatile memory systems. In particular, where different data scrambling is used in different removable memory units that provide redundancy, each unit contains a different data pattern, even though the original (unscrambled) data is the same for each unit. Thus, any errors induced by a particular data pattern in one unit is not reproduced in multiple units because of the different scrambling used. A RAID system using such scrambling incorporates protection against data pattern induced errors as well as device failure.

In one embodiment, a high-reliability nonvolatile memory storage system includes: a memory hub that includes a memory system controller, a host interface and a plurality of memory unit interfaces, the memory controller receiving data from the host interface and sending a copy of the received data to each of two or more of the plurality of memory unit interfaces; and a plurality of removable memory units, each of the plurality of removable memory units in communication with the memory system controller through a respective one of the plurality of memory unit interfaces, each of the plurality of removable memory units having a data scrambler that transforms data received from the memory hub prior to storing the transformed data in a nonvolatile memory array in the removable memory unit, each of the plurality of removable memory units performing a different transformation of received data prior to storage, the different transformations determined by memory unit identifiers associated with each of the plurality of removable memory units, each of the plurality of removable memory units having a different memory unit identifier.

A method of storing data in a memory system that includes a plurality of removable nonvolatile memory units linked to a common hub, according to an embodiment of the present invention comprises: transforming a portion of data according to a first transformation to obtain first transformed data; storing the first transformed data in a first removable nonvolatile memory unit of the plurality of removable nonvolatile memory units; transforming the portion of data according to a second transformation to obtain second transformed data; and storing the second transformed data in a second removable nonvolatile memory unit of the plurality of removable nonvolatile memory units as a redundant copy.

A removable nonvolatile memory module for use in a memory system with redundant data storage according to an embodiment of the present invention comprises: an array of nonvolatile memory cells; a physical interface for connecting the removable nonvolatile memory module to a host and for disconnecting the removable memory module from the host; and a data scrambler that transforms data received from the host through the physical interface prior to storage of the scrambled data in the array of nonvolatile memory cells, wherein the data scrambler transforms the data according to a transformation that is selected from a plurality of transformations by a user.

DETAILED DESCRIPTION OF ILLUSTRATED EMBODIMENTS

Various methods are used to achieve high reliability data storage in nonvolatile memory systems. Certain methods that improve reliability through redundancy use a Redundant Array of Independent Disks (RAID). There are different types of RAID systems that use mirroring, striping, and parity data, or some combination of these techniques. Although the term RAID is generally associated with Hard Disk Drives (HDDs), RAID techniques may be used with other types of memory including nonvolatile memory arrays such as flash memory.

While a redundant copy of data in a separate device protects against device failure, it does not protect against all possible forms of data loss. In particular, in certain nonvolatile memory arrays, particular patterns of data storage may increase the chances of data becoming corrupted. This may occur because of the interaction between adjacent cells, with floating gates of cells affecting not only their underlying channels, but also affecting neighboring channels and thus affecting threshold voltages of neighboring cells. This is especially a problem for MLC memory systems in which small changes in a cell's threshold voltage may result in one or more bits stored in the cell being incorrectly read. The problem tends to become more severe as dimensions in memory arrays become smaller and interactions between cells become stronger. For example, an MLC cell that is initially programmed to a low threshold voltage (little or no charge on its floating gate) may later have its threshold voltage raised because neighboring cells are programmed to high threshold voltages (large charges on their floating gates). This may be considered a form of program disturb. Which specific data patterns cause program disturb, and the degree of disturb caused (the number of bits that are later erroneously read) depends on the memory architecture. Thus, there may be particular patterns of data that will cause data stored in particular memory arrays to be read erroneously even though the memory array is working within its design limits. Avoiding such data patterns is generally desirable. In particular, in systems where redundant copies of data are stored, it is desirable that error-inducing data patterns are not replicated.

Many memory systems include some form of Error Correction Coding (ECC) in order to allow data containing some erroneous bits to be detected and corrected. In order to do this, the data is stored with some redundancy. When the data is read, the redundancy allows the data to be checked for errors, and up to some limited number of errors may be corrected. However, in order to correct a large number of errors, a high degree of redundancy is needed (a large number of extra bits) which is not an efficient use of memory space. Typically, the degree of redundancy used is based on expected error rates (e.g. based on a number of expected defective cells) and may not be sufficient to correct a high number of errors, such as caused by a particular data pattern. In particular, data pattern induced errors may occur together in the same portion of data in cells that are exposed to similar conditions, and ECC is generally limited to correcting only a limited number of bits in such a portion of data. Thus, ECC alone may not be sufficient to overcome data pattern induced errors in certain memory systems.

One approach to data patterns that may cause data to be uncorrectable when it is read is to scramble data before storage. Scrambling subjects data to some transformation so that the transformed data has a different pattern to untransformed data. In particular, such scrambling may introduce some randomization into a repeated pattern in the data. A simple example of a transformation is to invert (or flip) all bits, i.e. change all zeros to ones and change all ones to zeros. Other transformations involve performing exclusive OR (XOR) operations on data to be stored and some series of chosen bits. Unlike ECC, scrambling does not add redundant bits, so the scrambled data generally includes the same number of bits as the original data. In some cases, a transformation may compress data, reducing the number of bits to be stored. Some transformations use data security algorithms that may break up data patterns. U.S. patent application Ser. No. 11/861,146, entitled "Nonvolatile Memory with Self Recovery," filed on Sep. 25, 2007, gives examples of how data scrambling within a removable memory unit may be used to avoid the effects of pattern inducted errors in floating gate memory arrays.

Figure 1:
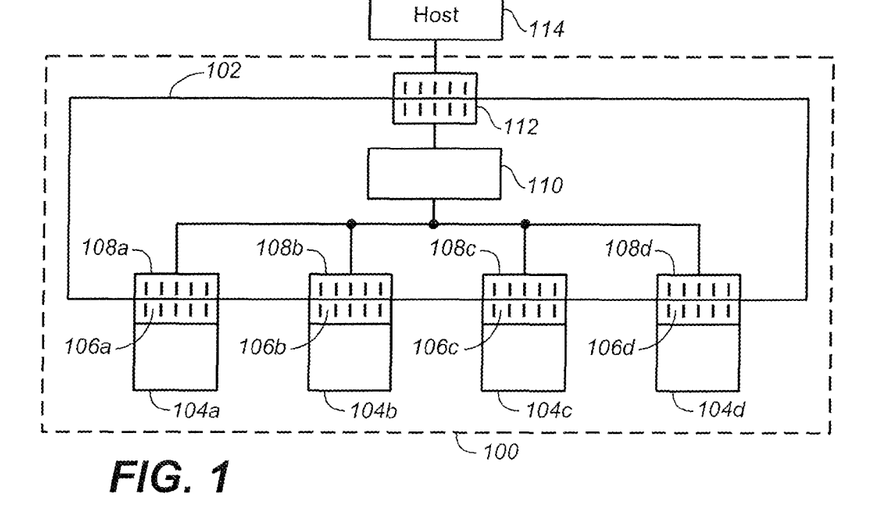
FIG. 1 shows a host connected to a memory system according to an embodiment of the present invention, the memory system including a memory hub and memory cards.

Removable nonvolatile memory units may be arranged in a similar manner to disk drives in a RAID so that high reliability is provided through redundant copies of data. One example of a memory system 100 using such an arrangement of removable memory units is shown in FIG. 1, which shows a memory hub 102 that is connected to multiple (in this case, four) removable memory units 104a-d. Memory hub 102 and the memory units 104a-d connected to it may be considered to be a memory system in this case. The removable memory units 104a-d in this example are memory cards having identical physical interfaces 106a-d (though different interfaces may also be used in some memory systems). The memory hub 102 has corresponding interfaces 108a-d to connect with the memory cards 104a-d. Memory cards 104a-d may be inserted and removed easily in this arrangement, so that the capacity of the system, and the degree of redundancy, can be easily configured. The memory card interfaces 108a-d in the hub 102 are connected to a memory system controller 110, which sends data to and from the individual memory cards 104a-d.

In particular, in the present example, the memory system controller 110 sends redundant copies of data to different ones of cards 104*a-d*, so that in the event of failure of one or more of cards 104*a-d*, the data on the failed card(s) can be recovered from elsewhere. The memory system controller 110 may use a single redundancy scheme, or may be configurable to employ a range of different redundancy schemes. The memory hub 102 also includes a host interface 112 which connects to a host 114. The host interface 112 may be a USB interface, PCMCIA interface, serial interface or some other standard or proprietary interface. The host 114 sends data to the memory system 100 for storage via the host interface 112. The memory system controller 110 then determines whether to make one or more copies of the data, and if so, where to store the copies. Typically, at least two copies are kept of any data sent by the host 114 (although schemes may also employ striping, in which redundancy may not be needed). While the example of FIG. 1 has four memory cards 104*a-d*, other examples may use a greater or lesser number of memory cards depending on the capacity and degree of redundancy desired. Also, other removable memory units besides memory cards may be used.

Figure 2A:
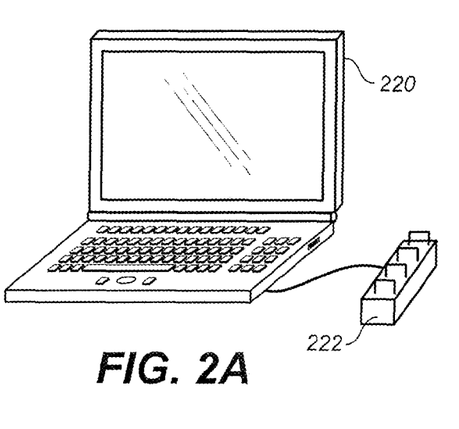
FIG. 2A shows a laptop computer as an exemplary host that is connected to an external memory system.
Figure 2B:
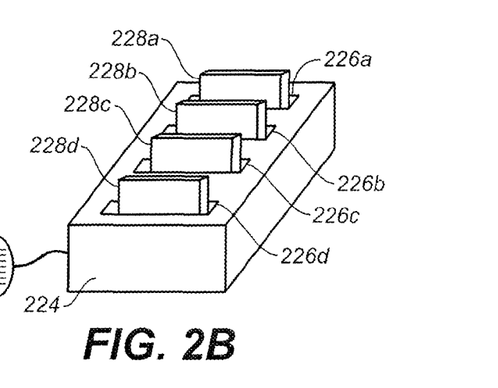
FIG. 2B shows a more detailed view of the external memory system of FIG. 2A including memory cards inserted in slots in a memory hub.

FIG. 2A shows an example of a host 220 connected to a memory system 222 such as the memory system 100 of FIG. 1. In this example, host 220 is a laptop computer, though other hosts may also be used including different computing systems and controllers used in industrial applications. The memory system 222 in this case includes a memory hub 224 with slots 226*a-d* for inserting memory cards, which is shown in more detail in FIG. 2B. In particular, FIG. 2B shows the memory hub 224 with memory cards 228*a-d* inserted in slots 226*a-d* so that memory cards 228*a-d* are in communication with the memory system controller through interfaces in the memory hub 224. While the memory hub 224 of FIG. 2B is one example of a memory hub, other embodiments may have removable memory units such as memory cards, USB flash drives, SSDs, or other removable nonvolatile memory units arranged in different ways.

Figure 3:
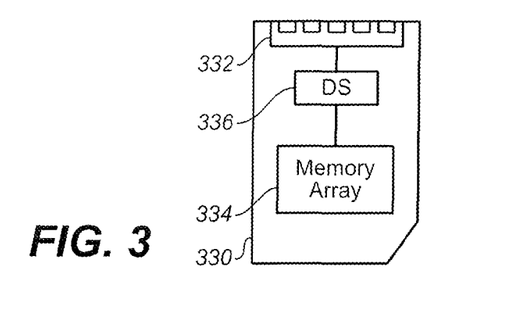
FIG. 3 shows an exemplary memory card having a data scrambler according to an embodiment of the present invention.

FIG. 3 shows a memory card 330 according to an embodiment of the present invention. Such a memory card may be used as one of memory cards 228*a-d* shown in FIG. 2B, or one of memory cards 104*a-d* in FIG. 1. The memory card 330 includes a physical interface 332 for connecting memory card 330 to a memory hub, or a host such as a PC, digital camera or MP3 player. The physical interface 332 generally follows a standard, such as those previously listed. The memory card 330 includes a memory array 334, which may include one or more memory chips in which data is stored. In addition, the memory card 330 includes a Data Scrambler (DS) 336 between the physical interface 332 and the memory array 334. The Data Scrambler 336 may be part of an Application Specific Integrated Circuit (ASIC) or memory controller. In general, a memory card such as memory card 330 will include such a memory controller which manages data management in the memory card. The Data Scrambler 336 may be part of this memory controller. In other examples, the data scrambler is a separate dedicated circuit that is not part of the memory controller. The data scrambler 336 may scramble all data that is stored in the memory array 334, or may scramble some data, with other data being directly stored without scrambling.

Figure 4A:
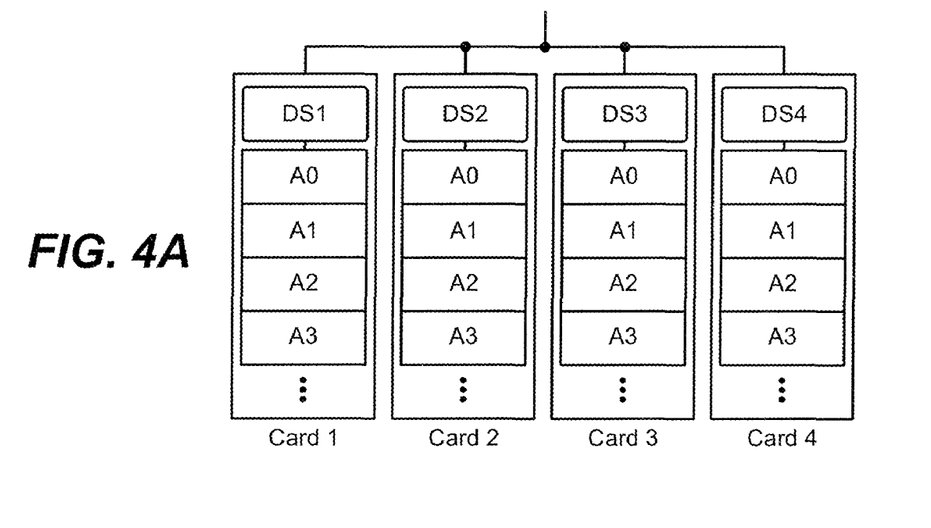
FIG. 4A shows an example of normal operation of four cards containing redundant data in a memory system, with each card performing identical data scrambling.
Figure 4B:
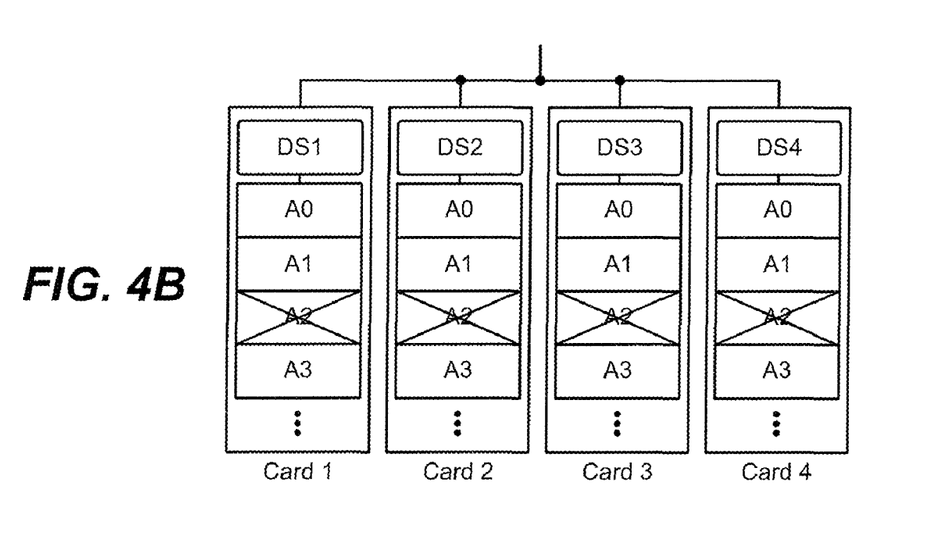
FIG. 4B shows an unrecoverable fault situation in the memory system of FIG. 4A as a result of data pattern induced errors that are replicated in each copy of a portion of data.

While scrambling of data prior to storage in the memory array may reduce the occurrence of pattern induced errors by randomizing data prior to storage, randomization alone may not be sufficient to prevent such patterns from ever occurring. If pattern induced errors occur in a portion of data, it is important in a high reliability system that the data be recoverable from some other source. FIG. 4A shows an example of using the same data scrambling routine in each card in a memory system during normal operation. Each of memory cards 1, 2, 3, and 4 has a data scrambler (DS1, DS2, DS3, and DS4 respectively), which performs an identical data scrambling operation on the same data. FIG. 4B shows the same memory cards 1-4 as FIG. 4A when data A2 is uncorrectable by ECC because of pattern induced errors (indicated by an X through data A2 in FIG. 4). Even though there are four different copies of data A2, each copy is identical and is stored in an identical memory array (all the memory cards have the same design) so the pattern induced errors occur in each copy of data A2 and the original data cannot be recovered.

Figure 5A:
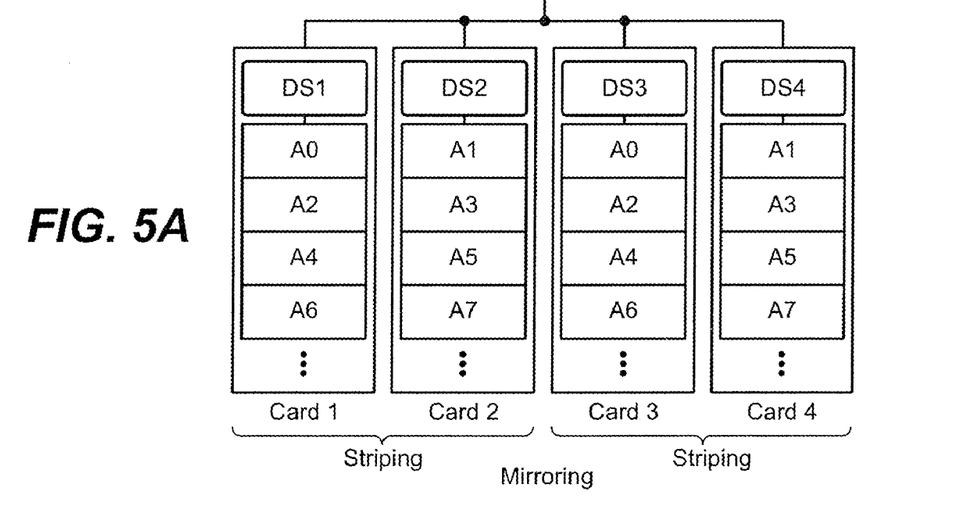
FIG. 5A shows an example of normal operation of another memory system in which all memory cards perform the same data scrambling and having data striping between pairs of cards.
Figure 5B:
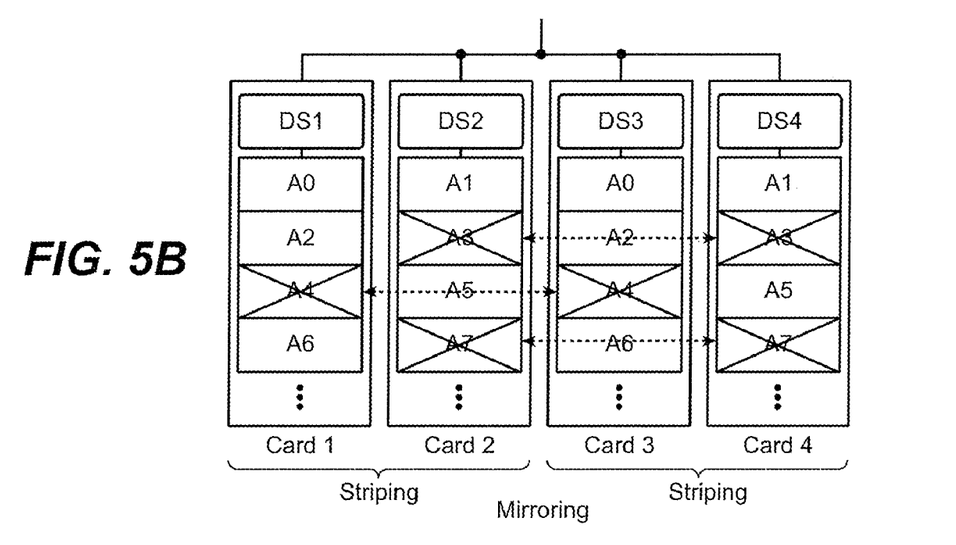
FIG. 5B shows the memory system of FIG. 5A with data pattern induced errors replicated in each copy of the data.

FIG. 5A shows another example in which data is striped across card 1 and card 2, and a redundant copy of the same data is maintained in card 3 and card 4. FIG. 5B shows the same memory system as FIG. 5A when uncorrectable errors occur due to data pattern induced error. In this case also, when pattern induced errors occur in one copy of a portion of data, the same errors occur in other copies of the same portion of data. Thus, for example, copies of data A3 in both card 2 and card 4 are uncorrectable. Copies of data A4 in both card 1 and card 3 are uncorrectable. Copies of data A7 in both card 2 and card 4 are uncorrectable. So each of data portions A3, A4 and A7 are unrecoverable even though two copies of each portion are stored in separate memory cards. Thus, because of the data pattern induced nature of certain errors, making redundant copies of data in identical memory units simply replicates the errors and does not provide a usable backup copy.

Figure 6A:
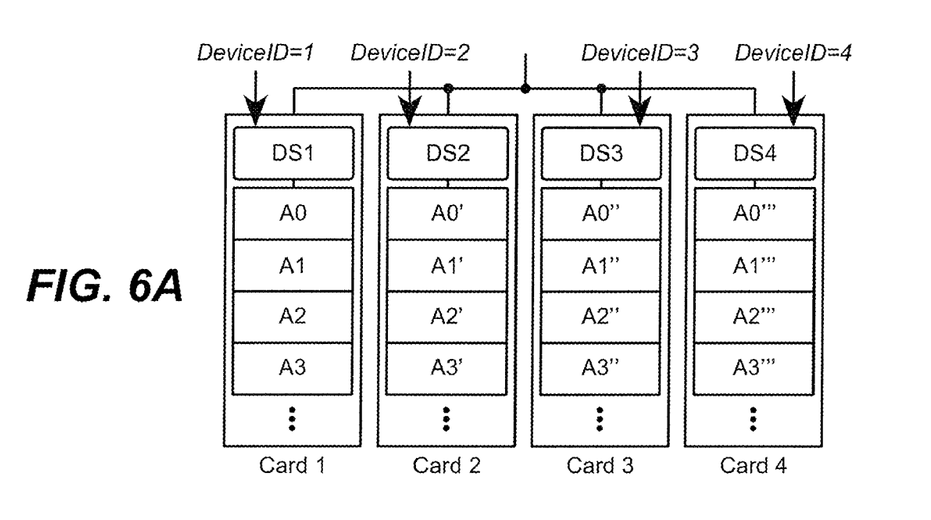
FIG. 6A shows normal operation of a memory system that includes four memory cards, each memory card performing different data scrambling as a result of having a different device ID.

In a system with redundancy, this problem can be overcome by storing two or more copies of data with two or more different data scrambling schemes. In this way, if pattern induced errors occur in one copy because of the particular pattern of data when it is stored, another copy of the data is stored with a different pattern as a result of different scrambling, and the second copy is unlikely to also suffer from pattern induced errors. FIG. 6A shows an example in which each of cards 1, 2, 3, and 4 has a different device ID, which causes each card to perform a different data scrambling routine. In particular, each device ID is provided to the card's data scrambler. In the example of FIG. 6A, card 1 has a device ID of 1, card 2 has a device ID of 2, card 3 has a device ID of 3, and card 4 has a device ID of 4. The data that is scrambled by DS1 according to device ID1 is indicated by A0, A1, A2, etc. The data that is scrambled by DS2 according to device ID2 is indicated by A0', A1', A2', etc. The data that is scrambled by DS3 according to device ID3 is indicated by A0", A1", A2", etc. The data that is scrambled by DS4 according to device ID4 is indicated by A0''', A1''', A2''', etc. Thus, for any given portion of data received from the memory system controller, four different versions of the data are stored in the four different cards, e.g. A0, A0', A0", A0'''.

Figure 6B:
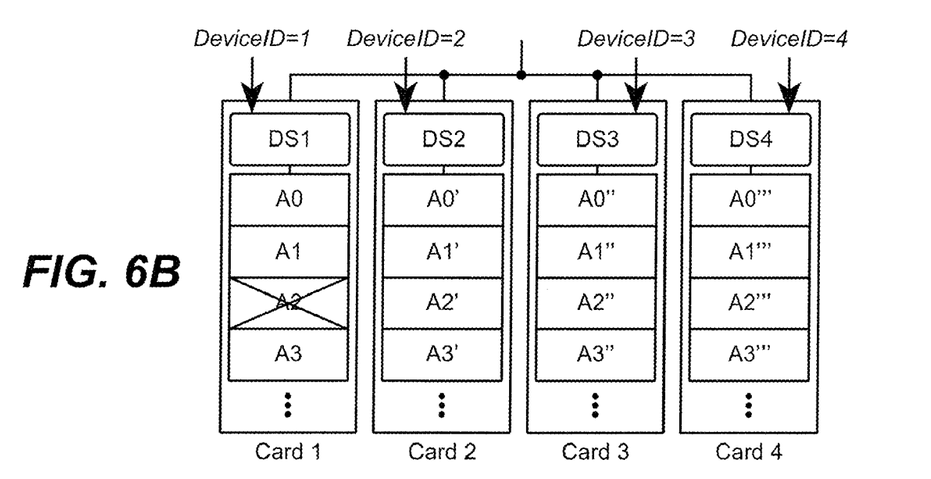
FIG. 6B shows the memory system of FIG. 6A when card 1 contains a data pattern that causes a portion of data to be unrecoverable, but cards 2, 3, and 4 contain copies of the same data that are scrambled so that they are not stored with an identical pattern.

FIG. 6B shows the result, when a pattern induced error occurs in data A2 of FIG. 6A. Data A2', A2" and A2''' have different data patterns to data A2 and therefore do not suffer from the same pattern induced error as data A2. In particular, data A2 is produced by data scrambler DS1 using a device ID of one (device ID=1), while data A2' is produced by data scrambler DS2 using a device ID of 2 (device ID=2) etc. These different device IDs cause different data scrambling operations to be performed by data scramblers DS1 and DS2. In one example, a device ID of one causes a first seed to be provided to data scrambler DS1 and the first seed is used in an XOR operation with the original data to produce data A2. Similarly, a device ID of two causes a second seed to be provided to data scrambler DS2 and the second seed is used in an XOR operation with the original data to produce data A2'.

Similarly, device IDs of three and four cause data scramblers DS3 and DS4 to produce data A2″ and A2‴ respectively. It is unlikely that any of data A2′, A2″ or A2‴ has uncorrectable pattern induced errors, or other errors, so there are three copies of data from which the original data may be recovered.

Figure 7A:
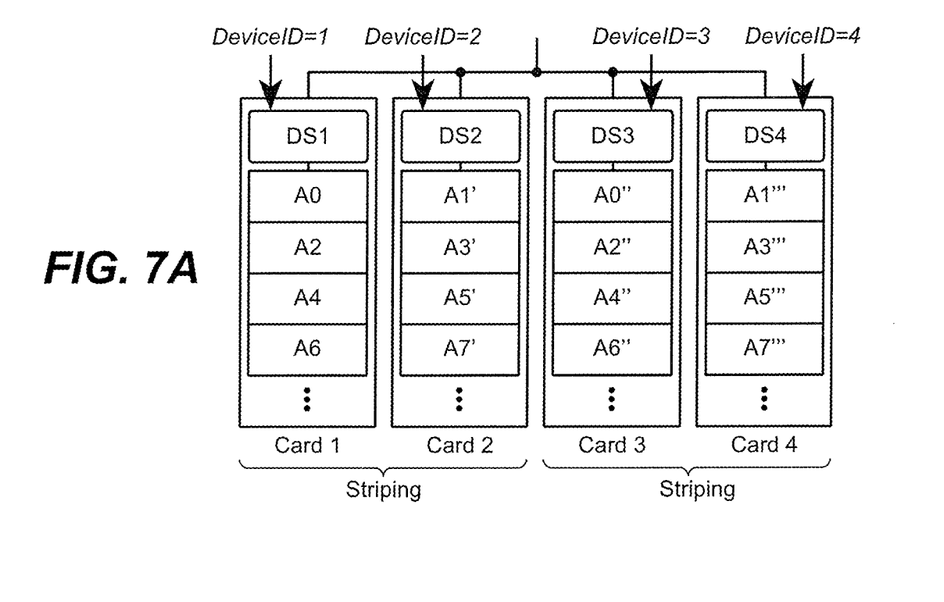
FIG. 7A shows an alternative memory system that includes striping, during normal operation, with each memory card performing different data scrambling as a result of having a different device ID.

FIG. 7A shows an alternative embodiment in which data is striped between cards. For example, data is striped between card 1 and card 2, with alternating units of data going to cards 1 and 2, e.g. A0 in card 1, A1′ in card 2, A2 in card 1, etc. Also the same data is striped between card 3 and card 4, so that there is a redundant copy of each portion of data. Redundant copies are differently scrambled prior to storage because each card performs a different scrambling as a result of having a different device ID.

Figure 7B:
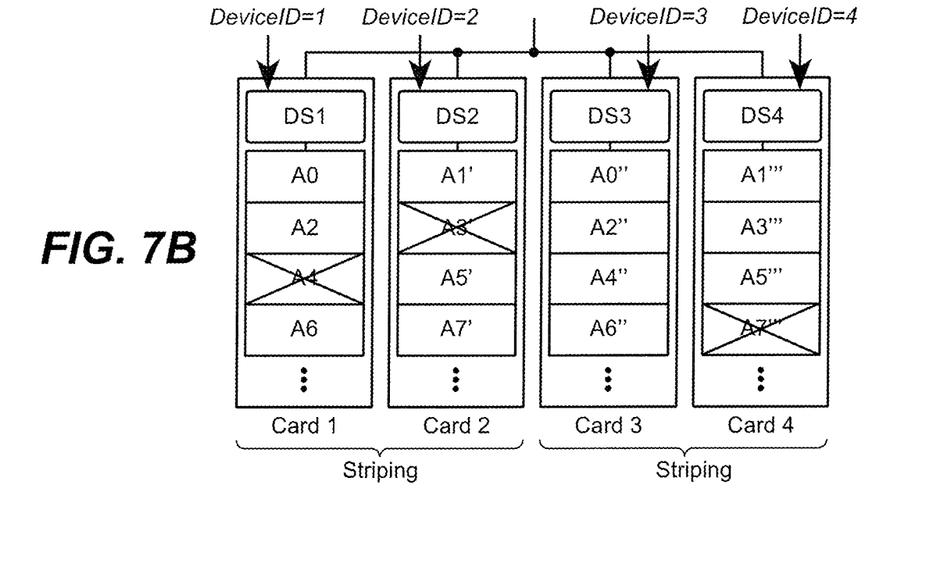
FIG. 7B shows the memory system of FIG. 7A when some portions of data have data patterns that cause uncorrectable errors, but other copies of the same data are stored with different patterns as a result of different scrambling.

FIG. 7B shows the result when certain portions of data in FIG. 7A are uncorrectable as a result of pattern induced errors (shown by X through uncorrectable data). Data portion A3′ in card 2 is uncorrectable, but the original data can be recovered from data A3‴ in card 4. Similarly, data portion A4 in card 1 is uncorrectable, but the original data can be recovered from A4″ in card 3. Data portion A7‴ in card 4 is uncorrectable, but the original data can be recovered from A7′ in card 2.

Different device IDs that cause different scrambling schemes in each card may be provided in various ways. In one example, each removable memory unit has a device ID that is permanently set. For example, the device ID may be set at the factory and stored in Read Only Memory (ROM) or using some other permanent storage mechanism. Generally, only a limited range of such removable memory units is needed, corresponding to the number of removable memory units used in the largest redundant memory system that is likely to be used. In one embodiment, a memory card has a clear visual indicator that shows which device ID the card has. For example, memory cards (or other removable memory units) may be color coded, with a range of different colors indicating a range of different device IDs and correspondingly different data scrambling schemes. In this way, a customer can buy cards of different colors for a memory system and know that each one stores data in a different arrangement so that data pattern induced errors are not duplicated between cards. If two cards were using the same data scrambling in such a system (thus providing a risk that both copies of a portion of data might suffer the same data pattern induced errors), this would be clearly visible to a user and could be easily rectified by replacing one of the cards with a card of a different color.

Figure 8A:
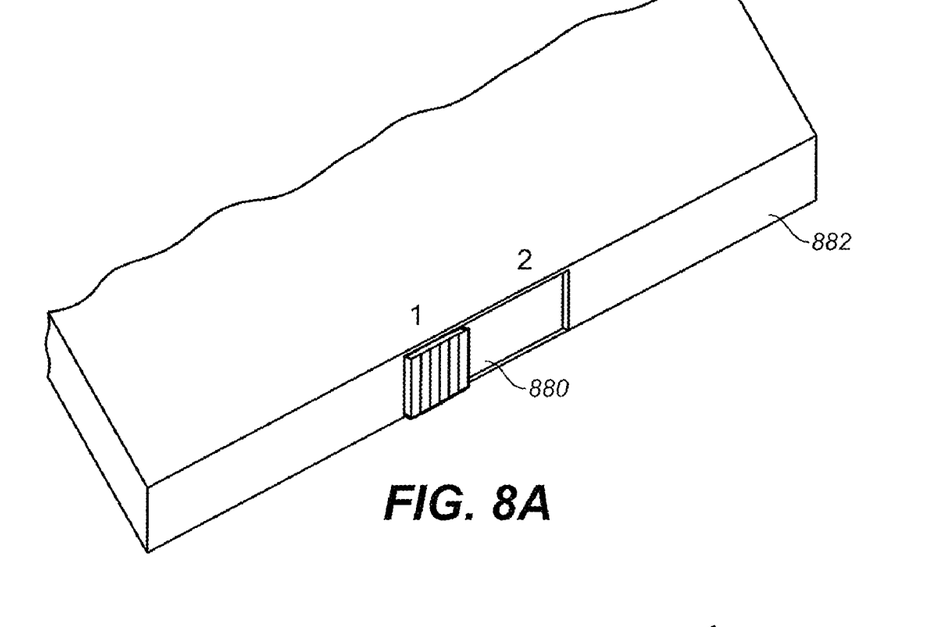
FIG. 8A shows a switch for selecting a device ID from two possible device IDs.
Figure 8B:
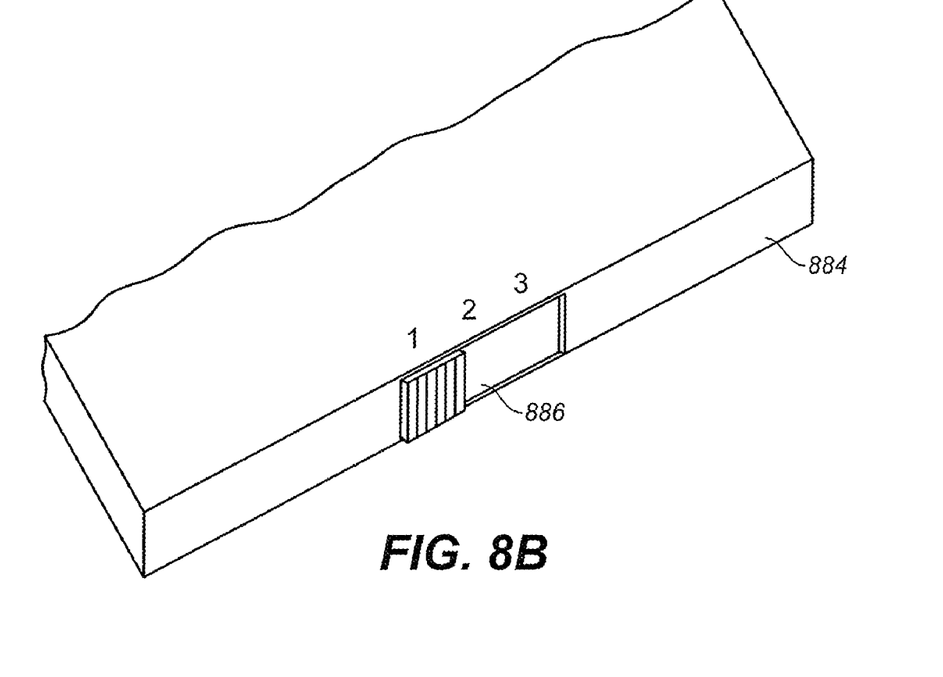
FIG. 8B shows a switch for selecting a device ID from three possible device IDs.

In another embodiment, removable memory units may have their device ID selected by a user through a physical switch on the card. FIG. 8A shows an example of such a switch 880 on the outside surface of a memory card 882 having two positions. When the switch 880 is in position 1, the device ID of memory card 882 is 1, and when the switch is in position 2, the device ID of memory card 882 is 2. In this way, two different cards may be used, with each card containing the same data, but with different scrambling so that any pattern induced errors in one copy are not identically reproduced in the other copy. FIG. 8B shows another example of a card 884 with a switch 886 that selects one of three different device IDs, numbered 1 to 3. In this case, up to three different cards may each use a different device ID so that three copies of a portion of data may be stored with different data scrambling to avoid reproducing data pattern induced errors.

In another embodiment, instead of having device ID permanently recorded in a removable memory unit, or temporarily selected by a user by a physical switch, a memory system controller (or other circuit) may select the device ID for each removable memory unit. In this way, a memory system controller in a memory hub may select different device IDs for each memory card that is connected to the memory hub.

Examples above include a dedicated data scrambler unit in each removable memory unit. This may be achieved through hardware by having a dedicated circuit (e.g. a peripheral circuit on a memory die) or may be done by a memory controller in the removable memory unit. In other examples, a dedicated circuit may be provided at each memory unit interface in the memory hub. In other examples, data scrambling may be achieved by firmware in a memory system controller in a memory hub so that the firmware ensures that different transformations are performed according to the destination device. Other hardware may also provide different scrambling to more than one device at a time. Thus, different scrambling schemes may be achieved without necessarily requiring different hardware for each device.

Various schemes described above may be combined with, or used to replace, other schemes that provide high reliability. For example, the schemes are generally combined with an ECC scheme that provides protection against failure due to a small number of errors in a portion of data. In general, the schemes described above are performed within a memory system and may not be visible to a host. However, in some cases, the degree of protection, or a particular protection scheme, may be selected by a user, through the host, or otherwise. In some cases, the host system may have its own protection scheme that is in addition to any protection scheme in the memory system. While particular examples are described with respect to memory cards, other removable memory units such as SSDs may be similarly used, and the present invention is not limited to a particular removable memory unit.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

Although the various aspects of the present invention have been described with respect to certain preferred embodiments, it is understood that the invention is entitled to protection within the full scope of the appended claims.

What is claimed is:

1. A high-reliability nonvolatile memory storage system, comprising:
   a memory hub that includes a memory system controller, a host interface and a plurality of memory unit interfaces, the memory system controller receiving data from the host interface and sending a copy of the received data to each of two or more of the plurality of memory unit interfaces; and
   a plurality of removable memory units, each of the plurality of removable memory units in communication with the memory system controller through a respective one of the plurality of memory unit interfaces, each of the plurality of removable memory units having a data scrambler that transforms data received from the memory hub prior to storing the transformed data in a nonvolatile memory array in the removable memory unit, each of the plurality of removable memory units performing a different transformation of received data prior to storage, the different transformations determined by memory unit identifiers associated with each of the plurality of removable memory units, each of the plurality of removable memory units having a different memory unit identifier.

2. The high-reliability nonvolatile memory storage system of claim 1 wherein each of the plurality of removable memory units has an associated memory unit identifier assigned by the memory system controller.

3. The high-reliability nonvolatile memory storage system of claim 1 wherein each of the plurality of removable memory units has an associated memory unit identifier permanently associated with the removable memory unit.

4. The high-reliability nonvolatile memory storage system of claim 1 wherein each of the plurality of removable memory units has an associated memory unit identifier selected by a physical switch in the respective removable memory unit.

5. The high-reliability nonvolatile memory storage system of claim 1 wherein each of the plurality of removable memory units is a memory card or a USB flash drive.

6. The high-reliability nonvolatile memory storage system of claim 5 wherein each of the plurality of removable memory units is a CompactFlash card, SmartMedia card, MultiMediaCard, Secure Digital card, miniSD card, Memory Stick, Memory Stick Duo card, or microSD/TransFlash card.

7. The high reliability nonvolatile memory storage system of claim 1 wherein each of the plurality of removable memory units is a solid state drive.

8. A method of storing data in a memory system that includes a plurality of removable nonvolatile memory units linked to a common hub, comprising:
   transforming a portion of data according to a first transformation to obtain first transformed data, the transforming performed by a first data scrambler in a first removable memory unit of the plurality of removable nonvolatile memory units;
   storing the first transformed data in the first removable nonvolatile memory unit;
   transforming the portion of data according to a second transformation to obtain second transformed data, the transforming performed by a second data scrambler in a second removable memory unit of the plurality of removable nonvolatile memory units; and
   storing the second transformed data in the second removable nonvolatile memory unit, the first and second data scramblers performing different transformations from each other, the different transformations determined by memory unit identifiers associated with each of the plurality of removable memory units, each of the plurality of removable memory units having a different memory unit identifier.

9. The method of claim 8 further comprising:
   assigning a first memory unit identifier to the first removable nonvolatile memory unit, the first memory unit identifier determining the first transformation; and
   assigning a second memory unit identifier to the second removable nonvolatile memory unit, the second memory unit identifier determining the second transformation.

10. The method of claim 8 wherein the first transformation is performed according to a first memory unit identifier that is permanently stored in the first removable nonvolatile memory unit and the second transformation is performed according to a second memory unit identifier that is permanently stored in the second removable nonvolatile memory unit.

11. The method of claim 8 wherein the first transformation is performed according to a first memory unit identifier that is selected by a first physical switch in the first removable nonvolatile memory unit, and the second transformation is performed according to a second memory unit identifier that is selected by a second physical switch in the second removable nonvolatile memory unit.

* * * * *